United States Patent [19]

Zeller

[11] 4,116,087

[45] Sep. 26, 1978

[54] ENERGY ABSORBING STRUCTURE FOR THE STEERING COLUMN OF A MOTOR VEHICLE

[75] Inventor: Gregor Zeller, Obernau, Fed. Rep. of Germany

[73] Assignee: Firma Petri AG, Aschaffenburg, Fed. Rep. of Germany

[21] Appl. No.: 712,357

[22] Filed: Aug. 6, 1976

[30] Foreign Application Priority Data

Aug. 8, 1975 [DE] Fed. Rep. of Germany ....... 2535063

[51] Int. Cl.² .............................................. B62D 1/04
[52] U.S. Cl. ........................................ 74/552; 74/492; 188/1 C
[58] Field of Search .................. 74/492, 493, 552; 188/1 C

[56] References Cited

U.S. PATENT DOCUMENTS

| | | | |
|---|---|---|---|
| 3,586,131 | 6/1971 | LeMire | 188/1 C |
| 3,589,210 | 6/1971 | Norman | 74/552 |
| 3,765,335 | 10/1973 | Blair | 188/1 C X |
| 3,911,759 | 10/1975 | Tanaka et al. | 74/492 |
| 3,948,118 | 4/1976 | Garbin | 74/552 |

Primary Examiner—Allan D. Herrmann
Attorney, Agent, or Firm—Joseph A. Geiger

[57] ABSTRACT

An energy absorbing structure for the steering column or steering wheel of a motor vehicle which undergoes energy absorbing plastic deformation under a high axial force, the structure comprising a plurality of angularly adjacent energy absorbing member portions of serpentine shape whose extremities are integral with or welded to the steering assembly, and which, while not deformable under torque, are stretchable in the axial direction, as the serpentine shapes are bent and their loops are twisted.

16 Claims, 11 Drawing Figures

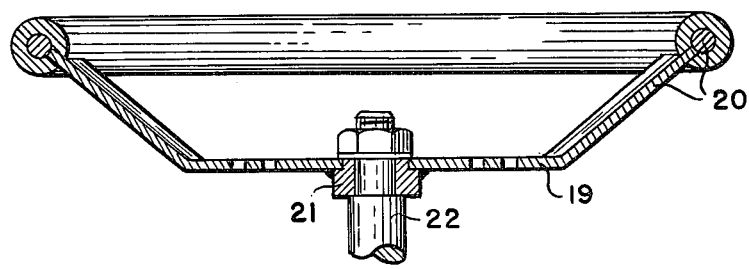
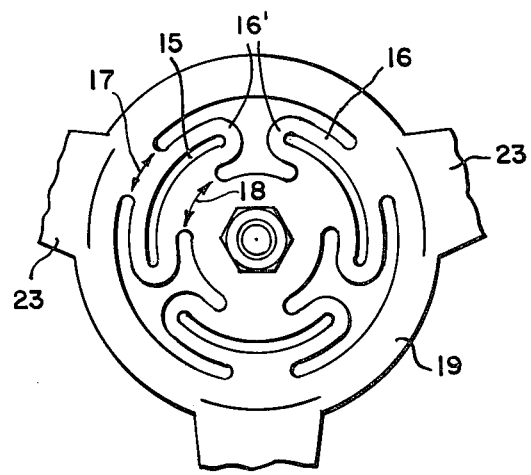
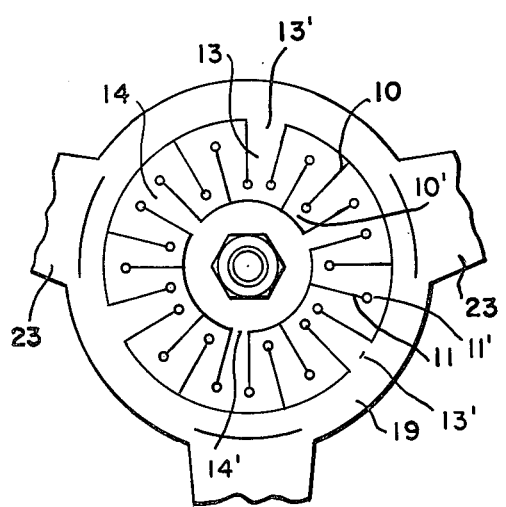
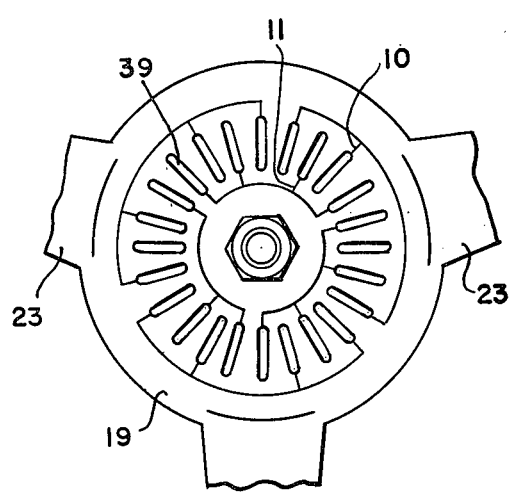

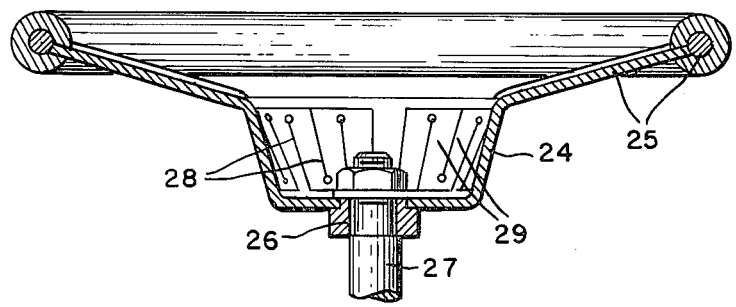
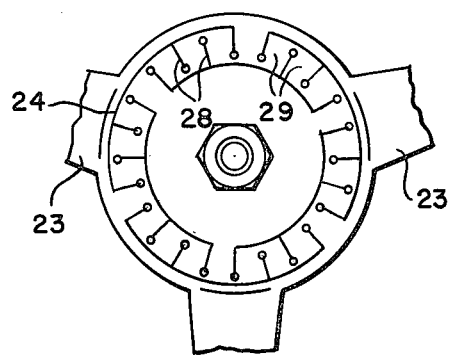
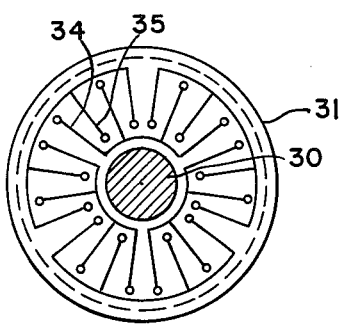
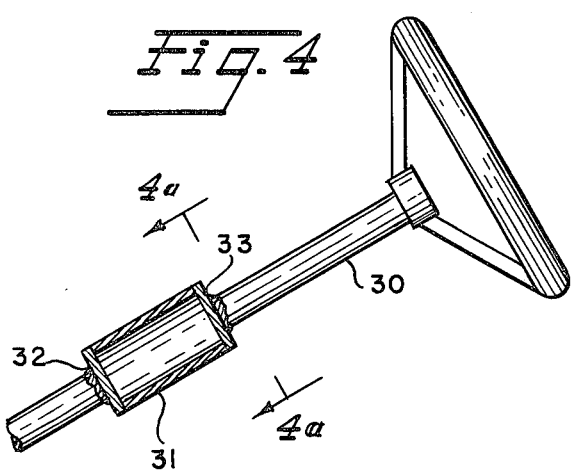

ENERGY ABSORBING STRUCTURE FOR THE STEERING COLUMN OF A MOTOR VEHICLE

BACKGROUND OF THE INVENTION

1. Field of the Invention

The present invention relates to the field of motor vehicles and, more particularly, to the steering column and steering wheel of a motor vehicle and to energy absorbing structural components for the latter.

2. Description of the Prior Art

Various improvements have been made in recent years in the structure and design of motor vehicles, including improvements which, like the present invention, are aimed at the protection of the driver of the motor vehicle in the case of a violent collision. The purpose of the present invention is specifically to reduce the effects of the so-called secondary collision which takes place inside the motor vehicle between the driver and the motor vehicle, split seconds after the primary collision between the vehicle and whatever it is colliding with. This secondary collision is particularly severe in the case of a head-on collision, when the vehicle is decelerated abruptly and the driver's kinetic energy propels him forwardly against the steering wheel and dashboard.

Various means and devices aimed at the absorption, i.e., the gradual transfer, of the impact energy from the driver to the steering wheel and steering wheel column during the secondary collision have been suggested in the past. There are basically two ways of absorbing impact energy of this type: elastic absorption, as by means of a spring or some other resiliently deformable member, and plastic absorption, which takes place when the energy is converted into permanent deformation work on the energy absorbing member. While the first type of energy absorption can take place repeatedly, the second type normally renders the energy absorbing member unserviceable for future use. However, the second type of energy absorption is much superior to the first, in that no subsequent release of the absorbed energy takes place and in that its energy absorption characteristics are more desirable, because a very small mass of material can absorb a large amount of impact energy through permanent deformation.

While some limited elastic absorption of impact energy is available with virtually every type of steering wheel, due to the natural resiliency of the steering wheel rim and/or of its spokes, the plastic absorption of impact energy in the steering wheel or in the steering wheel column has only in recent years become a serious objective. Various solutions to this problem have already been suggested, and they differ in terms of their design features, assembly arrangements, and materials utilized. As in all mass produced devices, a primary criterion for the acceptability and commercial success of a proposed solution is its manufacturing cost.

SUMMARY OF THE INVENTION

It is a primary objective of the present invention to provide an improved energy absorbing structure for the steering column assembly of motor vehicles, where the impact energy in the secondary collision is absorbed plastically, in the process of a permanent deformation of certain structural parts, the parts in question being of light weight, economical to mass produce, and easy to assemble. A further objective of the present invention is that the plastically deformable parts will give a maximum of deformation displacement without causing any parts or portions thereof to fracture and break apart.

The present invention proposes to attain the above objectives by suggesting an energy absorbing structure or member, designed for incorporation in the steering wheel or in the steering column proper, where a succession of integrally connected, normally rigid, segmental member portions are arranged in a common plane or in a simple cone shape, whereby the normally rigid segmental member portions are designed to be plastically deformed, when a predetermined axial force is applied to the steering column. Preferably, the segmental member portions are the result of a series of partial transverse cuts in an originally continuous wall, the cuts being so arranged that the segmental member portions remain interconnected in a serpentine manner.

The proposed energy absorbing structure or energy absorbing member is preferably a part, or several parts, having a circular outline and being arranged concentrically with the steering column axis. Depending upon the number of peripheral attachment points between the circular energy absorbing member and its cooperating parts of the steering column assembly, the cumulative length of the segmental member portions between attachment points will vary. This cumulative length and the bending and/or torsion characteristics of the material will determine the force at which the structure yields and the displacement distance over which energy absorption will take place.

In a preferred embodiment of the invention, the energy absorbing member is a flat disc which is interposed between the hub of the steering wheel and its spokes, the disc having a series of radial cuts extending alternatingly from the inner and outer peripheries of the disc to relief bores near the respective opposite periphery, the inner periphery of the disc being welded to the hub at three or more points, while the outer periphery of the disc is similarly welded to the steering wheel spokes.

Another embodiment of the invention features multiple serpentine or arcuate shapes which are arranged in the place of the aforementioned radially cut disc, these shapes being similarly aligned in a flat plane and welded locally to the wheel hub and to the wheel spokes, respectively. Still other embodiments of the invention feature a dish-shaped steering wheel in the place of the spoked wheel, where the radial or serpentine cuts are provided in the wall of the steering wheel itself. It is also possible to arrange the deformable segmental portions in other than a flat shape, using a cone shape, for example.

Lastly, the proposed novel energy absorbing structure need not be arranged between the steering wheel rim and its hub, but it can also be arranged at some other place on the steering column assembly. For instance, it is possible to interpose between separate length portions of the steering column itself a torsion transmitting hollow body whose axial end members are energy absorbing discs of the type proposed by the present invention. On the other hand, it should be understood that the novel energy absorbing structure of the invention could also be advantageously employed in other applications outside the steering column assembly, where exceptional impact forces are to be absorbed through plastic deformation of the energy absorbing structure.

BRIEF DESCRIPTION OF THE DRAWINGS

Further special features and advantages of the invention will become apparent from the description following below, when taken together with the accompanying drawings which illustrate, by way of example, several embodiments of the invention, represented in the various figures as follows:

FIG. 2 is likewise a cross section of the upper end of a steering column assembly, showing a second embodiment of the invention;

FIGS. 2a, 2b, and 2c show in plan view three different versions of the basic embodiment of FIG. 2;

FIG. 3 is likewise a cross section of the upper end of a steering column assembly, representing a third embodiment of the invention;

FIG. 3a is a partial plan view of the steering wheel of FIG. 3;

FIG. 4 shows a steering column assembly, where the invention is arranged in the column itself as a fourth embodiment thereof; and FIG. 4a shows an enlarged axial view of the embodiment of FIG. 4.

DESCRIPTION OF THE PREFERRED EMBODIMENTS

Figure 1:
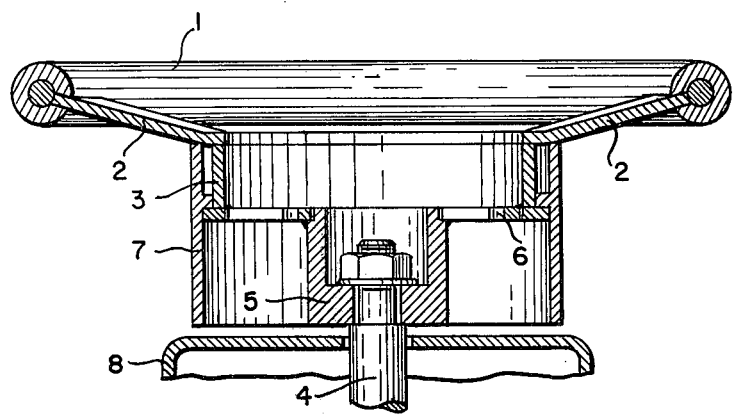
FIG. 1 is a cross section of the upper end of a steering column assembly, representing a first embodiment of the invention.
Figure 1A:
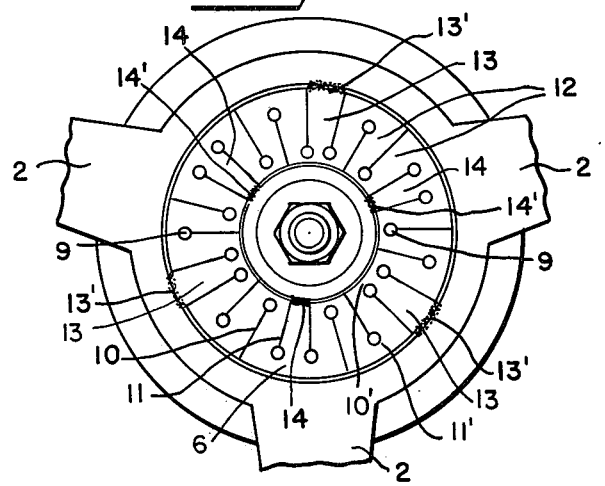
FIGS. 1a and 1b are plan views of the center portion of the steering wheel of FIG. 1 showing two alternative versions of the embodiment of the invention shown in FIG. 1.
Figure 1B:
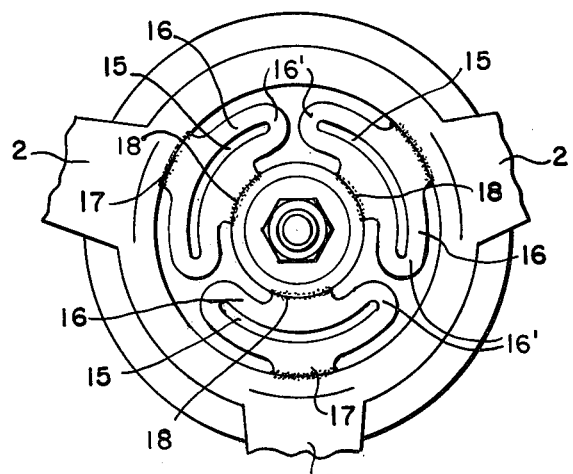

Referring to FIGS. 1, 1a, and 1b of the drawing, there can be seen two versions of a first basic embodiment of the present invention. As FIG. 1 shows, this embodiment is the steering wheel for a motor vehicle. The steering wheel assembly consists essentially of a rim 1 which is connected by several spokes 2 to a cylindrical spoke support ring 3. To the upper end of the steering column 4 is clamped a hub sleeve 5, and the latter, in turn, is connected to the earlier-mentioned spoke support ring 3 by means of a generally disc-shaped energy absorbing member 6. The member 6, being seated on a suitable shoulder recess of the upper extremity of the hub ring 5, thus rigidly connects the spoke support ring 3 to the steering column 4.

FIG. 1a and FIG. 1b show two different versions of the energy absorbing member 6 of FIG. 1, the energy absorbing member being a flat disc, or occupying the space of such a disc. FIG. 1a shows such a disc-shaped energy absorbing member, the body of the disc having a number of alternatingly radially inwardly and radially outwardly extending cuts 10 and 11, respectively, which terminate in relief bores 9 arranged at a short distance from the opposite periphery. The radial cuts 10 and 11 thus define between them a serpentine-like succession of segmental member portions 12 which are interconnected in succession by loop portions 10' and 11' which consist of the residual wall material remaining between the relief bores 9 and the adjacent disc periphery.

The pattern of radial cuts in member 6 is preferably so arranged that alternatingly at three points on the outer and inner peripheries of the disc, two cuts extend in the same direction to produce outer and inner attachment tongues 13 and 14, respectively, by means of which the energy absorbing member 6 is welded to the spoke support ring 3 at 13' and to the hub ring 5 at 14'. The steering wheel spokes 2 are similarly welded to the rim 1 and to the spoke support ring 3.

The assembly of FIGS. 1 and 1a is thus normally rigid. As can readily be seen in FIG. 1a, the energy absorbing member 6 will not yield in the rotational sense, even under extreme torques, because the segmental member portions 12 form a continuous body in the rotational direction. If, on the other hand, an axial force in excess of a predetermined level, or a force with a comparable axial component, is applied to the steering wheel rim 1, such a force will cause the energy absorbing member 6 to yield in the axial direction on at least a portion of its circumference. Referring again to FIG. 1a, the particular pattern of radial cuts 10 and 11 shown there indicates that, between each outer peripheral weld 13' and each inner peripheral weld 14' of the member 6, there are five segmental member portions, each having an effective length approximately equal to the radial width of the member 6. Accordingly, an axial force applied to one or several of the outer attachment tongues 13 will create a bending moment in the tongue 13 and in the adjoining three segmental member portions 12, as well as in the inner attachment tongue 14. Simultaneously, a torsion condition will be created in the material which is left between the relief bores 9 and the adjacent periphery, which material defines a the radial loop portions 10' and 11' between adjacent segmental member portions 12.

The bendability of the serpentine-like connected segmental member portions 12 and attachment tongues 13 and 14, in combination with the twistability of the aforementioned radial loop portions 10' and 11' linking them, gives the energy absorbing member 6 a considerable degree of plastic deformability, without causing any material fractures. The extent of plastic deformability can be predetermined by choosing the appropriate number of segmental member portions between attachment points. The force level above which the energy absorbing member 6 will yield can be predetermined by choosing the appropriate wall thickness, radial width, radial length of cut, and material for the energy absorbing member 6. The material is preferably steel.

In FIG. 1b is shown a different version of an energy absorbing structure where the energy absorbing member actually consists of three identical angularly spaced flat connecting members 16 which may or may not have been cut from a single flat disc. Again, the inner peripheral connections with the hub sleeve 5 and the outer peripheral connections with the spoke support ring 3 are welds, but, in this case, the outer peripheral welds 17 are angularly aligned with the inner peripheral welds 18. The desired deformability of the energy absorbing structure is again obtained by providing serpentine-like wall portions between the inner and outer peripheral attachment points, except that in this case the yielding portions form loops in the circumferential sense, rather than in the radial sense. These loops are the result of an arcuate slot 15 in the midportion of each connecting member 16. Again, the connecting members are practically rigid and non-yielding in the rotational sense, even under a sudden high torque. But, when an axial force of a magnitude above the deformation limit is applied to the steering wheel, one or more of the connecting members 16 will yield in the axial sense. The total deformation displacement obtainable is the result of a combination of bending and twisting deformations, the circumferentially extending portions of the member 16 being primarily subjected to bending, while the short radial loop portions 16' are subjected to torsion.

While the two versions of the first basic embodiment of the invention which have just been described feature a flat energy absorbing member in one case, and angularly adjacent sectional energy absorbing members (which could have been stamped out of a disc) in the other case, it should be understood that it is also possible to form the loops of the energy absorbing members, especially those of the second version, from rod material which may be round or square in cross section. On the other hand, it should likewise be understood that the illustration and description of but one energy absorbing member between the spoke support ring 3 and the hub sleeve 5 is not to be seen as precluding the arrangement of two or more energy absorbing members in axial succession. It follows that the present invention lends itself readily to numerous adaptive changes and modifications by means of which a large range of energy absorption conditions can be met.

In FIGS. 2, 2a, 2b and 2c is illustrated a second basic embodiment of the invention. Here, the steering wheel spokes 23 are unitary extensions of a central disc-shaped portion of the steering wheel assembly, and this disc-shaped portion of the steering wheel assembly itself serves as the energy absorbing member 19. Accordingly, while the center portion of the energy absorbing member 19 is again attached to a hub ring 21, its outer portion defines the steering wheel spokes 23 as integral extensions thereof.

FIGS. 2a 2b and 2c suggest again different versions of the basic embodiment of FIG. 2, the structure of FIG. 2a being similar to the structure shown in FIG. 1b, while the pattern of cuts in FIG. 2b is similar to the pattern of cuts in FIG. 1a. However, the three versions of FIGS. 2a 2b and 2c differ from the previously described structures, inasmuch as the inner and outer peripheral attachments are no longer welds, as the energy absorbing member 19 feature instead inner and outer ring portions to which the energy absorbing member portions are integrally attached. The inner ring portion can thus be conveniently welded to the hub ring 21, while the outer ring portion serves as a rigid link between the spokes 23 of the steering wheel. In FIG. 2c, the inner and outer relief bores 9 of the radial cuts 10 and 11 have been replaced with radial slots 39 extending between the radii on which would be located the relief bores 9.

In FIGS. 3 and 3a is illustrated a third basic embodiment of the invention. This embodiment is a modification of the embodiment of FIG. 2, the energy absorbing member 24 being again an integral portion of a unitary wheel skeleton 25. However, the steering wheel assembly of FIG. 3 differs from that of FIG. 2 inasmuch as the wheel of FIG. 3 features a dish-shaped central portion in the place of the disc-shaped central portion of the previously described embodiment. It is this dish-shaped central portion which is attached to a hub ring 26 on the upper extremity of the steering column 27, while the radial spokes extend outwardly from the upper edge portion of the "dish." Unlike in the previously described embodiments, however, the pattern of alternatingly oppositely oriented cuts is no longer located in a plane which is transverse to the steering column axis, but is located on a truncated cone defined by the dish-shaped outline of the energy absorbing member 24. Otherwise, the arrangement of the cuts 28 and the deformation displaceability of the segmental member portions 29 is similar to the arrangement of the cuts 10 and 11 of FIG. 1a and FIG. 2b and to the deformation displaceability of the segmental member portions 12 of FIG. 1a and of FIG. 2b, respectively.

While the various embodiments of the invention which have been described so far suggest the incorporation of the novel energy absorbing structure in the steering wheel, between its spokes and the hub attaching it to the steering column, there are other places on the steering column assembly where the invention can be arranged advantageously. One such example is illustrated in FIGS. 4 and 4a. This embodiment features a steering column 30, where a hollow cylindrical body 31 is interposed between separate length portions of the column 30 which are attached to the axial end members 32 and 33, of the cylindrical body 31. One or both of these end members are arranged to serve as energy absorbing members. As can be seen in FIG. 4a, such an end member has again arranged in its wall a series of alternatingly radially inwardly and outwardly extending cuts 34 and 35, defining deformable segmental member portions which are comparable to those described earlier in connection with FIG. 1a and FIG. 2b. Obviously, the arrangement of such an energy absorbing structure in the steering column itself does not preclude the arrangement of a similar energy absorbing structure in the steering wheel.

The various embodiments of the invention which have been described above are characterized by great simplicity of design, ease of fabrication and assembly, and operational reliability. Because of its simplicity and low cost, the present invention is ideally suited for mass production in connection with the steering column assemblies of motor vehicles.

However, while primarily intended for this application, there may be various other applications, in the field of motor vehicles and elsewhere, where the proposed novel energy absorbing structure of the invention can be advantageously employed. Examples of such alternative applications would be bumper attachments and seat belt anchors for cars and other transportation equipment, and buffer mountings for railroad cars, for example.

It should be understood, of course, that the foregoing disclosure describes only preferred embodiments of the invention and that it is intended to cover all changes and modifications of these examples of the invention which fall within the scope of the appended claims.

I claim the following:

1. An energy absorbing structure, particularly suited for use in a torque transmitting, rotationally rigid assembly, such as a steering wheel assembly, for example, which, when subjected to an axial force in excess of a predetermined level, undergoes plastic deformation, thereby absorbing energy from the source of said axial force, the structure comprising in combination:
   an energy absorbing member having an outward shape which resembles that of an annular connecting member of uniform wall thickness, an inner connecting line and an outer connecting line being defined on opposite loop portions 16' of the energy absorbing member; and
   means defined by said torque transmitting assembly for connecting the energy absorbing member to two separate torque transmitting portions of the torque transmitting assembly at said inner and outer connecting lines, respectively; and wherein:
   the energy absorbing member includes, between said inner and outer connecting lines, a plurality of angularly adjacent energy absorbing member portions which, when viewed in the direction perpendicular to said wall, have a serpentine shape, each serpentine-shaped member portion having one extremity attached at the inner connecting line to one of the two torque transmitting portions, and another extremity attached at the other connecting line to the other torque transmitting portion; and the serpentine-shaped member portions have loop portions which are so tight that substantially no deformation of the loop portions can take place under torque transmission by the energy absorbing member, said loop portions being subjected to and plastically yielding to torsion stress, when said axial force is applied to the energy absorbing member, via its inner and outer connecting lines, while the serpentine shape of the member portion is permanently stretched in the axial direction, undergoing plastic bending deformation, as the inner and outer connecting lines of the energy absorbing member shift in relation to one another in the axial direction.

2. An energy absorbing structure as defined in claim 1, wherein said inner and outer connecting lines between the energy absorbing member and the torque transmitting assembly coincide with two concentric circles around a rotational axis defined by the torque transmitting assembly.

3. An energy absorbing structure as defined in claim 2, wherein the outward shape of the energy absorbing member resembles the shape of a connecting disc; and the inner and outer connecting lines of the member are located at inner and outer diameters of said disc.

4. An energy absorbing structure as defined in claim 2, wherein the outward shape of the energy absorbing member resembles the shape of a tapered connecting sleeve;

the inner and outer connecting lines of the member are located in the area of the axial extremities of said sleeve; and the energy absorbing member has attached to it, at its inner connecting line, an inwardly extending flange portion connecting it to the torque transmitting assembly.

5. An energy absorbing structure as defined in claim 2, wherein the energy absorbing member is a substantially flat metallic disc, having inner and outer peripheral diameters coinciding with said concentric inner and outer connecting lines; and said extremities of the serpentine-shaped portions of the energy absorbing member are attached to said torque transmitting portions by welds on the connecting lines.

6. An energy absorbing structure as defined in claim 2, wherein the energy absorbing member is a substantially planar integral portion of a larger member of the torque transmitting assembly;

the concentric inner and outer connecting lines of the energy absorbing member are located on inner and outer diameters, respectively;

the inner and outer peripheries of the energy absorbing member are defined by arcuate separating cuts on said inner and outer diameters, respectively, with uncut arc portions therebetween defining said attached extremities at the inner and outer connecting lines with the torque transmitting assembly.

7. An energy absrobing structure as defined in claim 2, wherein the outward shape of the energy absorbing member is substantially flat, its inner and outer connecting lines being located on inner and outer diameters, respectively;

said serpentine-shaped portions of the energy absorbing member are constituted by several segmental member portions which extend alternatingly radially inwardly and radially outwardly between said inner and outer diameters and which are linked by inner and outer loop portions; and the segmental member portions abut against each other in the circumferential sense on at least inner and outer loop portions.

8. An energy absorbing structure as defined in claim 7, wherein the serpentine-shaped portions of the energy absorbing member adjoin each other in the angular sense at the attached extremities of said member portions; and the adjoining attached extremities terminate at the same connecting line.

9. An energy absorbing structure as defined in claim 7, wherein the energy absorbing member is a metal disc having arranged therein a series of angularly spaced radial cuts extending inwardly from the outer disc diameter to inner end points located a short distance outside the inner diameter, and a series of angularly spaced radial cuts extending outwardly from the inner disc diameter to outer end points located a short distance inside the outer diameter;

the inwardly extending radial cuts alternate with the outwardly extending radial cuts so as to define said segmental member portions;

the disc portions surrounding the inner and outer end points of the cuts define said inner and outer loop portions which, by connecting together a succession of segmental member portions, form said serpentine-shaped portions of the energy absorbing member; and each thusly defined serpentine-shaped portion has one segmental member portion terminating at the outer connecting line, where it is rigidly connected to a portion of the torque transmitting assembly, and one segmental member portion terminating at the inner connecting line, where it is rigidly connected to another portion of the torque transmitting assembly.

10. An energy absorbing structure as defined in claim 9, wherein the energy absorbing member has relief cutouts at the outer and inner end points of the inwardly and outwardly extending radials cuts, respectively.

11. An energy absorbing structure as defined in claim 10, wherein the relief cutouts are relief bores.

12. An energy absorbing structure as defined in claim 10, wherein the relief cutouts are radially oriented relief slots extending between the radii on which are located the inner and outer end points of the radial cuts.

13. An energy absorbing structure as defined in claim 2, wherein the outward shape of the energy absorbing member is generally flat and disc-like;

said serpentine-shaped portions of the energy absorbing member have their attached extremities facing radially inwardly and outwardly and arranged in angular alignment on said concentric circles with which the inner and outer connecting lines coincide;

each serpentine-shaped member portion forms a closed loop shape consisting of two centrally joined serpentine-shaped open loops which extend circumferentially in opposite directions from their attached extremities.

14. An energy absorbing structure as defined in claim 13, wherein the energy absorbing member comprises three angularly regularly spaced member portions, each having an arcuate central body with an arucate, endwise closed slot arranged therein, and a radially inwardly and a radially outwardly extending body portion in the center portion of said body forming said attached extremities.

15. An energy absorbing structure as defined in claim 14, wherein the three portions of the energy absorbing member are metal stampings and have their attached extremities welded to said portions of the torque transmitting assembly.

16. An energy absorbing structure as defined in claim 14, wherein the energy absorbing member is a substantially planar integral portion of a larger member of a torque transmitting assembly;

the concentric inner and outer connecting lines of the energy absorbing member are located on inner and outer diameters, respectively;

the three portions of the energy absorbing member are defined by contouring cutouts on said inner and outer diameters and around the serpentine shape of said member portions, with three uncut portions on the inner connecting line and three uncut portions on the outer connecting line defining said extremities by which the serpentine-shaped member portions are attached to the torque transmitting assembly.

* * * * *